United States Patent
Kujihashi

(10) Patent No.: US 6,858,999 B2
(45) Date of Patent: Feb. 22, 2005

(54) DC BRUSHLESS MOTOR CONTROL APPARATUS

(75) Inventor: Yoshiyuki Kujihashi, Hyogo-ken (JP)

(73) Assignee: Itoh Denki Company, Limited, Kasai (JP)

( * ) Notice: Subject to any disclaimer, the term of this patent is extended or adjusted under 35 U.S.C. 154(b) by 0 days.

(21) Appl. No.: 10/616,885

(22) Filed: Jul. 10, 2003

(65) Prior Publication Data

US 2004/0021435 A1 Feb. 5, 2004

(30) Foreign Application Priority Data

Jul. 31, 2002 (JP) ........................................ 2002-222647

(51) Int. Cl.[7] .................................................. H02K 7/14
(52) U.S. Cl. .................................. 318/6; 318/3; 318/10; 318/254
(58) Field of Search .......................... 318/3, 6, 10, 138, 318/254, 439; 242/324, 333, 333.4, 333.7, 349

(56) References Cited

U.S. PATENT DOCUMENTS

| | | | | |
|---|---|---|---|---|
| 3,471,099 A | * | 10/1969 | Albert .................... | 242/412.3 |
| 3,606,198 A | * | 9/1971 | Gilbreath et al. ........ | 242/334.2 |
| 4,497,459 A | * | 2/1985 | Yoshino et al. .......... | 242/334.3 |
| 4,525,654 A | * | 6/1985 | Tajima et al. ................... | 318/7 |
| 4,620,241 A | * | 10/1986 | Ono ........................ | 360/73.14 |
| 4,776,528 A | * | 10/1988 | West ....................... | 242/332.1 |
| 4,801,853 A | * | 1/1989 | Lewis et al. .................... | 318/7 |
| 4,942,411 A | * | 7/1990 | Polston .................... | 353/26 R |
| 5,038,158 A | * | 8/1991 | Ayers et al. .................. | 347/55 |
| 5,086,964 A | * | 2/1992 | Blaser ........................ | 226/108 |
| 5,555,050 A | * | 9/1996 | Wakabayashi et al. ...... | 396/406 |
| 5,717,424 A | * | 2/1998 | Simson et al. ............. | 345/110 |
| 6,028,206 A | * | 2/2000 | Chattopadhyay et al. ... | 549/510 |

FOREIGN PATENT DOCUMENTS

| | | |
|---|---|---|
| JP | 7-253758 | 10/1995 |
| JP | 10-20812 | 1/1998 |
| JP | 2002-116719 | 4/2002 |

* cited by examiner

*Primary Examiner*—Rina Duda
(74) *Attorney, Agent, or Firm*—Duane Morris LLP

(57) ABSTRACT

Drivers (12a, 12b) drive respective DC brushless motors (8a, 8b) having rotor position detecting Hall-effect devices. A CPU (18) detects the numbers of rotations of the respective motors (8a, 8b) in response to the detection of the positions of the rotors by the Hall-effect devices, and causes the driving of the motors (8a, 8b) by the drivers (12a, 12b) to stop when the detected number of the rotations attains a preset value.

3 Claims, 4 Drawing Sheets

DC BRUSHLESS MOTOR CONTROL APPARATUS

This invention relates to an apparatus for controlling a DC brushless motor and, more particularly, to such control apparatus for controlling the stopping of a DC brushless motor.

BACKGROUND OF THE INVENTION

When moving an article by means of a motor, it may be required to stop the article precisely at a desired position. For that purpose, an inverter may be used in combination with an AC motor, or a dedicated control apparatus may be used with a servo motor. Furthermore, an encoder or the like is usually used in association with the motor for determining the number of rotations of the motor for such position control.

Because of the use of encoders, such motor control is expensive. Also, an expensive programmable logic circuit is required for giving commands to the inverter or the servo motor control apparatus. In addition, for modifying the contents of the programmable logic circuit, a writing device and external content-modifying switches must be used.

An object of the present invention is to provide a motor control apparatus which does not require such encoder and other associated apparatuses mentioned above, and, therefore, can be manufactured at a low cost.

SUMMARY OF THE INVENTION

A control apparatus according to the present invention is used to control a DC brushless motor. The DC brushless motor includes Hall-effect devices and a plurality of armature windings. The Hall-effect devices are used to detect a position of a rotor. Drive means changes currents to be supplied to the respective armature windings in accordance with the position of the rotor as detected by the Hall-effect devices, and drives the DC brushless motor with such currents. In response to the detection of the position of the rotor by the Hall-effect devices, control means determines the number of rotations of the DC brushless motor, and, when the number of the rotations reaches a preset value, the driving of the DC brushless motor with the drive means is stopped.

According to the present invention, taking advantage of the fact that Hall-effect devices used in place of brushes of a DC brushless motor can be used to determine the number of rotations of the motor, the motor is stopped from rotating when the number of the rotations as determined by the Hall-effect devices reaches a preset value. Thus, the present invention can eliminate the use of an encoder and its associate devices, which results in reduction of manufacturing costs.

A plurality, e.g. two, of such DC brushless motors may be controlled. The two motors are used to drive two spaced apart rotation shafts, to which opposite ends of a long strip are secured. The two rotation shafts are rotated in such a manner that, when one rotation shaft is rotated to feed out the strip, the other rotation shaft is rotated to wind the strip up. The control means operates to stop driving the respective DC brushless motors based on the sum of the numbers of the rotations of the rotors of the two motors as detected by the Hall-effect devices of the respective motors.

As the strip on one rotation shaft is fed out, the diameter of a roll including the one rotation shaft and the strip wound on it becomes smaller while the diameter of a roll including the other rotation shaft and the strip wound on it increases. Thus, for the same number of rotations for a unit time period, the length of the strip fed out from one rotation shaft decreases as the strip is fed out, and the length of the strip wound on the other rotation shaft increases as the strip is wound. Therefore, in order to feed out or wind up the same amount of the strip, it would be necessary to change the preset values related to the numbers of the rotations for a unit time period for the respective motors. However, when the two motors are rotated for the same time period, the sum of the numbers of the rotations of the two brushless motors is constant. Accordingly, it is not necessary to change the preset values if the control of the motors is based on the sum of the numbers of the rotations of the two motors.

The strip may be a strip of posters of the same length having their adjacent edges extending perpendicularly to the length of the strip joined together. In this case, the preset value corresponds to the length of one poster. With this arrangement, it is possible to move a desired poster to a location intermediate between the two rotation shafts. It should be noted that only one preset value is required for all of the posters.

Each of the DC brushless motors may be housed within an associated rotation shaft, whereby the arrangement can be downsized.

DESCRIPTION OF EMBODIMENT

Figure 2:
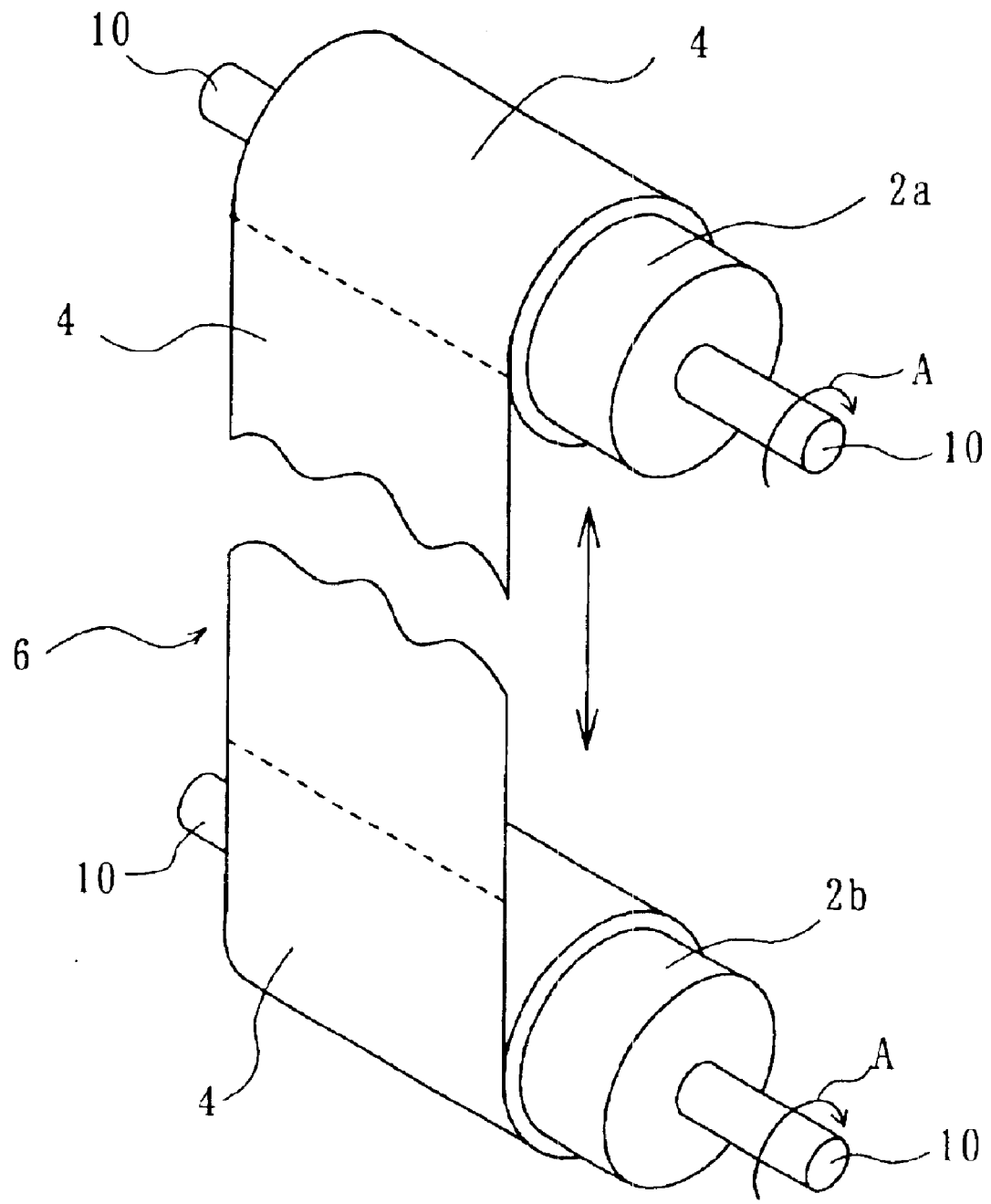
FIG. 2 is a partly broken away, perspective view of the advertisement machine of FIG. 1.

The present invention may be embodied in, for example, a motor-driven advertisement machine which includes, as shown in FIG. 2, two vertically spaced apart rotation shafts 2a and 2b. A strip 6 is extended between the rotation shafts 2a and 2b. The strip 6 is formed of a plurality of posters 4 of the same length by joining edges, extending perpendicular to the length direction, of adjacent ones of the posters 4. More specifically, one end of the strip 6 is secured to the rotation shaft 2a while the other end of the strip 6 is secured to the other rotation shaft 2b. The strip 6 is arranged such that when the rotation shafts 2a and 2b are driven to rotate in a direction indicated by an arrow "A" in FIG. 2, the strip 6 can be wound up onto the rotation shaft 2a while the portion of the strip 6 wound on the rotation shaft 2b is fed out. In other words, the posters 4 of the strip 6 move upward. On the other hand, by driving the rotation shafts 2a and 2b in the direction opposite to that indicated by the arrow "A", the strip 6 is fed out from the rotation shaft 2a while it is wound up onto the rotation shaft 2b. In other words, the posters 4 move downward.

In order to drive the rotation shafts 2a and 2b, DC brushless motors 8a and 8b are housed within the rotation shafts 2a and 2b, respectively. The rotation of the brushless motors 8a and 8b is transmitted to the associated rotation shafts 2a and 2b via associated rotation transmitting arrangements, e.g. speed reducers (not shown), which are also disposed within the respective rotation shafts 2a and 2b.

The rotation shafts 2a and 2b are mounted on securing shafts 10 in such a manner as to be rotatable about them, and the shafts 10 are secured to frames (not shown).

Figure 1:
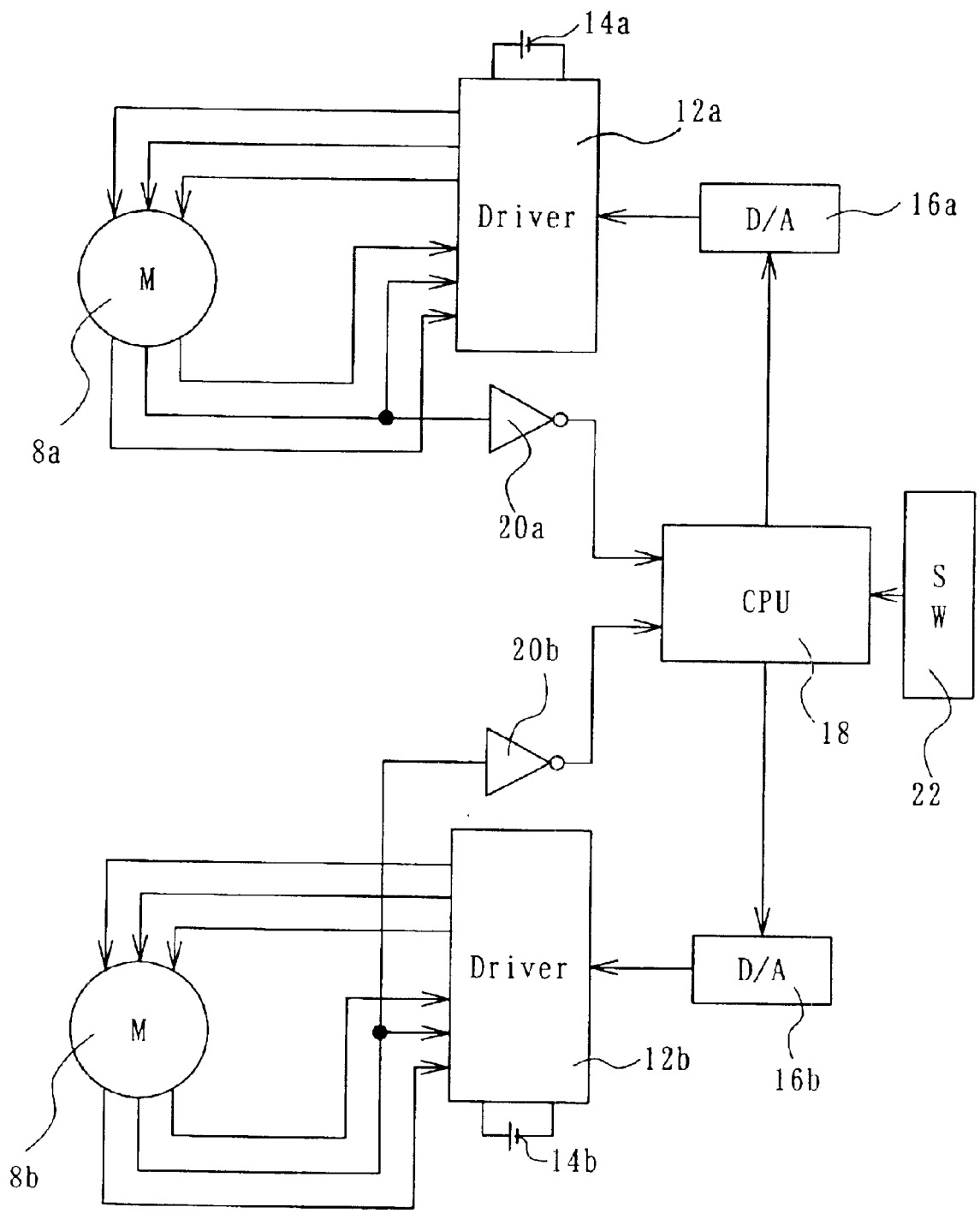
FIG. 1 is a block circuit diagram of a motor-driven advertisement machine according to one embodiment of the present invention.

As shown in FIG. 1, the DC brushless motors 8a and 8b are driven by drive means, e.g. drivers 12a and 12b, respectively. Each of the drivers 12a and 12b switches the armature to be supplied with current among a plurality, e.g. three (3), of armatures of its associated motor 8a or 8b, to thereby drive the motors 8a and 8b to rotate. Although not shown, a plurality, e.g. three (3), of Hall-effect devices are provided within each of the motors 8a and 8b for use in controlling the rotation of the motors 8a and 8b. The Hall-effect devices detect each of the poles of the rotor. If the rotor is a four-pole rotor, six (6) pulses are generated by the three Hall-effect devices while the rotor makes one rotation. The pulses are supplied to the respective drivers 12a and 12b, which, in turn, use the supplied pulses in driving the respective motors 8a and 8b to rotate in a desired direction. Each of the drivers 12a and 12b includes an inverter (not shown) which converts a DC voltage supplied thereto from an associated DC supply 14a or 14b into an AC voltage. The conduction periods of the respective inverters are PWM controlled to vary the magnitude of the current flowing through the armatures of the motors 8a and 8b, whereby the rotation speeds of the DC brushless motors 8a and 8b are controlled.

Speed control signals for use in controlling the rotation speeds of the respective motors 8a and 8b are supplied to the respective drivers 12a and 12b from control means, e.g. a CPU 18, via respective digital-to-analog (D/A) converters 16a and 16b. The speed control signals may be, for example, DC voltages of which magnitudes are increased when the rotation speeds of the motors 8a and 8b are to be increased.

The CPU 18 is supplied with the pulses from one of the Hall-effect devices of the motor 8a. The pulses are developed in response to the detection of one of the poles of the rotor of the motor 8a. The CPU 18 is supplied with the pulses from one of the Hall-effect devices of the motor 8b, too. These pulses are equivalent to the ones supplied with respect to the motor 8a. These pulses from the Hall-effect devices are inverted by inverters 20a and 20b before they are supplied to the CPU 18.

The CPU 18 is provided with setting means, e.g. a switch circuit 22, by which a value corresponding to the distance over which the strip 6 should travel before it is stopped, is set. The distance is, for example, the length of one poster 4. For another posters having a different length, the switch circuit 22 is used to change the set value to the one for the new posters.

Figure 3:
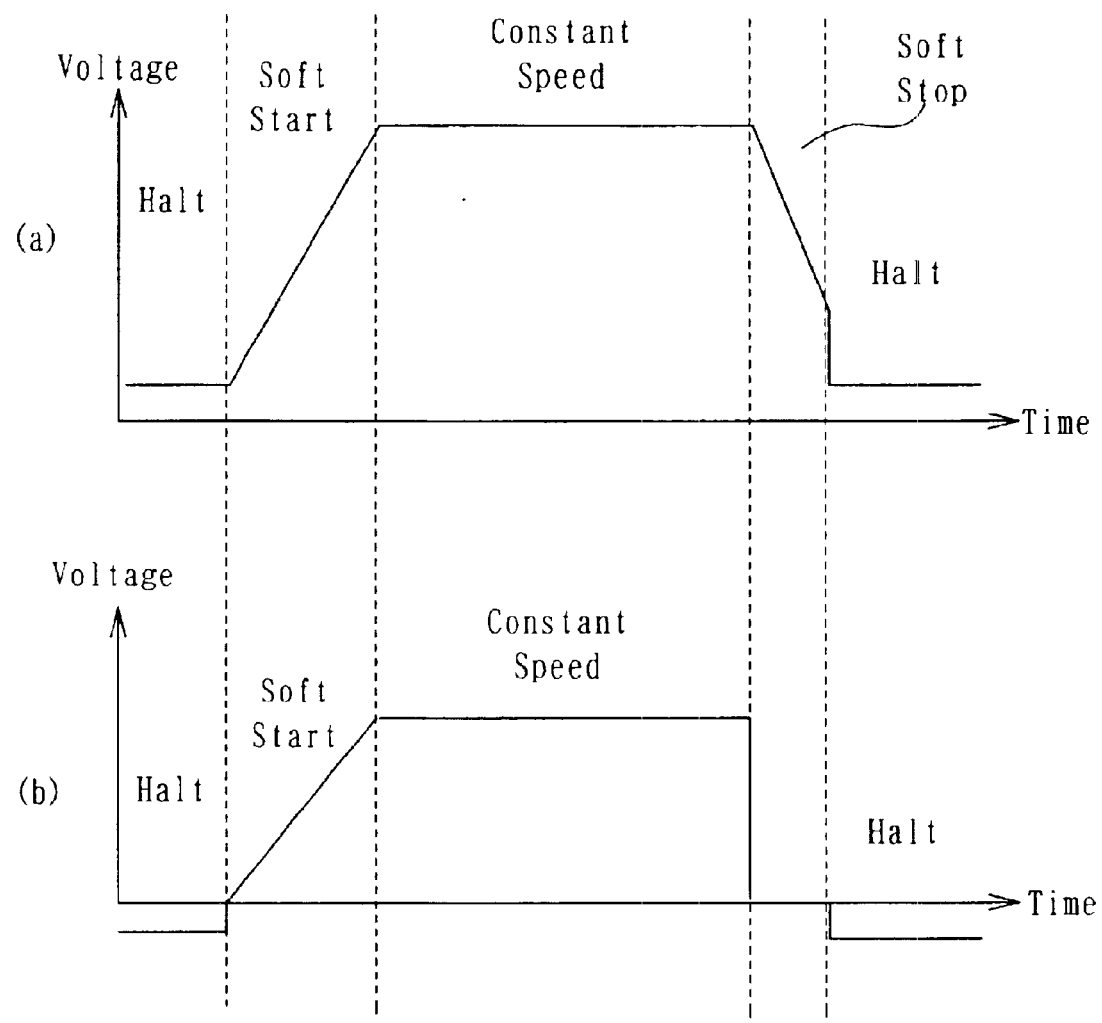
FIGS. 3(a) and 3(b) show how the rotation rates of the motors used in the advertisement machine of FIG. 1 change.

Next, general description of the controls provided on the motors 8a and 8b by the CPU 18 is given with reference to FIGS. 3(a) and 3(b), which illustrate changes of the voltages supplied to the drivers 12a and 12b for the motors 8a and 8b, respectively. During a Halt period, the drivers 12a and 12b are supplied with low voltages of a sense to wind up the strip 6 on the associated rotation shafts 2a and 2b, so that the strip 6 is tensioned. In this state, one of the posters 4 is located intermediate between the rotation shafts 2a and 2b.

Then, a gradually increasing voltage is supplied to each driver 12a, 12b from the CPU 18 so that the speeds of the motors 8a and 8b increase to given values in a soft-start fashion. These given speeds for the motors 8a and 8b are different, and the one for the motor 8a is higher. When the motors 8a and 8b attain the respective given speeds, they continue to rotate at the given speeds. In this case, the motors 8a and 8b rotate in such a direction as to wind up the strip 6 onto the rotation shaft 2a. Since the motor 8a rotates at a higher speed than the motor 8b, the strip 7 is tensioned and is not slack.

As the motors 8a and 8b rotate at the respective given speeds, each Hall-effect device of the motors 8a and 8b provides the CPU 18 with two pulses for one rotation of the rotors. The CPU 18 causes the motors 8a and 8b to rotate at the given speeds until one half of the sum of the numbers of the pulses supplied from the motors 8a and 8b becomes equal to the preset value corresponding to the length of one poster 4.

Let it be assumed that the strip 6 is to be wound on the rotation axis 2a, that, before the rotation axes 2a and 2b start rotating, the diameter of a roll including the rotation axis 2a and the strip 6 wound on it is 50 mm, while the diameter of a roll including the rotation axis 2b and the strip 6 wound on it is 60 mm, and that the diameter of roll including the rotation axis 2a has become 60 mm as a result of winding up of the strip 6 while that of the roll including the rotation axis 2b has become 50 mm. (It is assumed that the strip 6 is wound without the slack.) (Hereinafter, the diameters of the rolls including the rotation shaft 2a and 2b and the strip 6 wound on them are referred to simply as the diameters of the rotation shafts 2a and 2b.) Let the motor 8a and, hence, the rotation shaft 2a, be considered. The length of the strip 6 wound on the rotation shaft 2a, when its diameter is 50 mm, rotated by one rotation of the motor 8a is different from the length when the diameter of the shaft 2a is 60 mm. Accordingly, in order to wind up the strip 6 by the length of one poster 4 and stop it, the set value for stopping the motor 8a should be successively changed. For example, if the set value for winding a first poster 4 is 10, then, the set value for winding the succeeding second poster 4 would be changed to, for example 8.

However, as far as the two motors 8a and 8b are rotated for the same time period, the sum of the pulses generated by the Hall-effect devices of the motors 8a and 8b is constant because, when the diameter of the rotation shaft 2a associated with the motor 8a changes from 50 mm to 60 mm, the diameter of the rotation shaft 2b associated with the motor 8b changes from 60 mm to 50 mm, for example. Accordingly, if the motors 8a and 8b are arranged to be stopped, based on the sum of the pulses generated by the Hall-effect devices, the sum of the pulses generated during the movement of the strip 6 to place the poster 4 in the desired position is constant, regardless of the position in the strip 6 of a desired poster 4. Accordingly, there is no need to change the set value for posters at different positions in the strip 6, but it is sufficient to set only one set value for all the posters 4. In addition, there is no need for determining the position of an aimed poster 4 in the strip 6. These features can reduce the cost for manufacturing the advertisement machine.

When the aimed poster 4 has been moved a predetermined distance, the motor 8b is immediately stopped while the motor 8a is subjected to soft-stop operation to thereby gradually decrease its rotation speed until the poster 4 arrives at the desired position. Then, the motors 8a and 8b are placed in the Halt state. In this state, the drivers 12a and 12b for the motors 8a and 8b receive low voltages in a sense to wind up the strip 6 around the respective rotation shafts 2a and 2b, respectively, so that the strip 6 is tensioned, as previously described.

Figure 4:
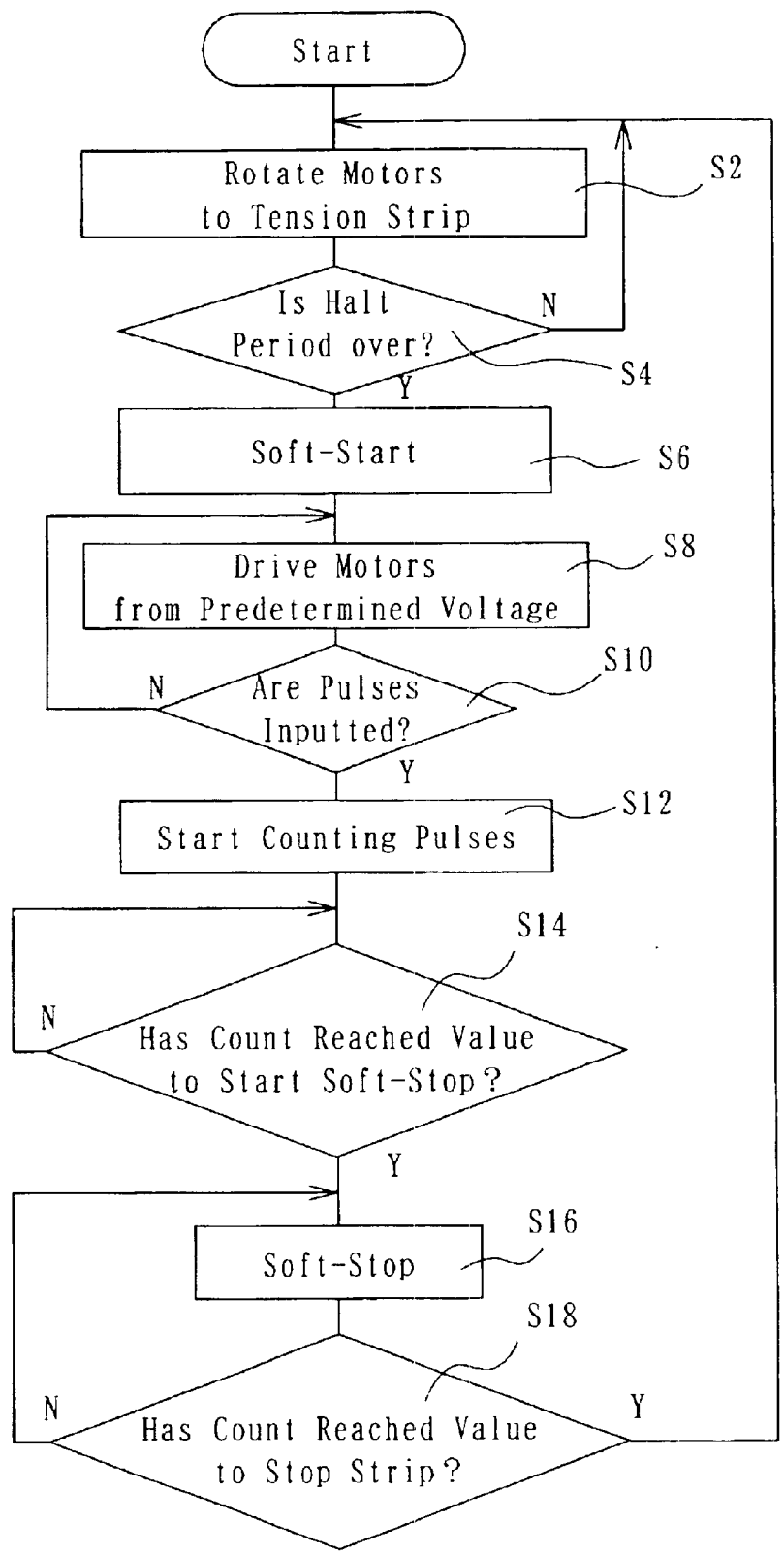
FIG. 4 is a flow chart of processing carried out by a CPU shown in FIG. 1.

FIG. 4 is a flow chart of the processing carried out by the CPU 18 for controlling the motors 8a and 8b in the described manner. First, voltages of opposite senses to cause the strip 6 to be wound around the rotation shafts 2a and 2b are applied to the drivers 12a and 12b for the respective motors 8a and 8b (Step S2). Then, whether a predetermined Halt period has lapsed or not is judged (Step S4). If the judgment is NO, the processing in Steps S2 and S4 is repeated until the Halt time period lapses.

When it is judged that the predetermined Halt time period has lapsed, a soft-start operation takes place (Step S6). In the soft-start operation, the voltages to be applied to the drivers 12a and 12b are incremented by predetermined increments at predetermined time intervals. (The increments predetermined for the drivers 12a and 12b are different from each other.) The voltages are incremented a predetermined number of times, until the voltages attain the predetermined values, which are also different for the respective drivers 12a and 12b. The motors 8a and 8b are driven to rotate from these predetermined voltages (Step S8).

Then, whether pulses are supplied to the CPU 18 from the Hall-effect devices of the motors 8a and 8b is judged (Step S10). Steps 8 and 10 are looped until the pulses are supplied to the CPU 18.

When the pulses are begun to be supplied from the Hall-devices of the respective motors 8a and 8b to the CPU 18, they are counted and summed (Step S12). Then, whether the sum reaches the number predetermined in relation to the position where the motor 8a is to be subjected to the soft-stop operation for decelerating the motor 8a (Step S14). If the answer is NO, the processing in Step S14 is repeated until the predetermined number of pulses are supplied. During this operation, the predetermined voltages are being applied to the drivers 12a and 12b for the respective motors 8a and 8b.

When the judgment made in Step S14 becomes YES, the soft-stop operation is started with respect to the motor 8a (Step S16). At this instant, the voltage supplied to the driver 12b for the motor 8b has changes to zero (0). In Step S16, each time the sum of the pulses from the Hall-effect devices of the motors 8a and 8b increases to a respective one of predetermined values, the voltage applied to the driver 12a is decreased by a predetermined amount or decrement. Then, a judgment is made as to whether the sum of the pulses indicates that the aimed poster 4 has moved to the predetermined position where it should be stopped (Step S18). If the poster 4 has not reached the predetermined position yet, Step S16 and Step S18 are executed in loop until the poster 4 arrives at the predetermined position.

Upon arrival of the aimed poster 4 at the desired position, Step S2 is executed, and the strip 6 stops for the Halt period. After that, a next poster 4 is moved to the predetermined position in the same manner as described above.

Although not mentioned above, after the strip 6 has been wound up around the rotation shaft 2a to the maximum extent, the motors 8a and 8b are rotated in the direction opposite to the direction mentioned above so that the strip 6 can be wound around the rotation shaft 2b in a manner similar to the above-described one.

In the above-described embodiment, the movement of the strip 6 is controlled based on the number of pulses the Hall-effect devices of the motors 8a and 8b generate, but any other suitable arrangement may be used in place of the use of the Hall-effect devices.

The present invention may be used to control two DC brushless motors used in an arrangement in which pulling straps are coupled between respective ones of opposite ends of an article and respective ones of the motors, and the straps are synchronously wound by the motors which are controlled based on pulses generated by Hall-effect devices the respective motors are provided with. Similarly, motors of a motor-driven XY table may be controlled based on pulses from Hall-effect devices of the motors according to the present invention.

The present invention has been described by means of an embodiment in which commands in the form of digital signals from the CPU 18 are converted into analog signals in the D/A converters 16a and 16b before being applied to the drivers 12a and 12b. However, the commands in the form of digital signals from the CPU 18 may be applied directly to the drivers 12a and 12b.

What is claimed is:

1. A DC brushless motor control apparatus comprising:

a DC brushless motor having a Hall-effect device for detecting the position of a rotor of said motor, and having a plurality of armature windings;

driving means for switching a current to be supplied to each of said armatures in accordance with the position of said rotor as detected by said Hall-effect device, to thereby cause said motor to rotate; and control means for detecting the number of rotations of said DC brushless motor based on the detection, by said Hall-effect device, of the position of said rotor and causing the driving of said DC brushless motor by said driving means to stop when the detected number of the rotations of said motor reaches a preset value;

wherein:

two such DC brushless motors are used, said two motors having respective rotation shafts spaced apart from each other;

opposite ends of a long strip are secured to said respective rotation shafts, said rotation shafts being arranged to be rotated by said respective motors in such a manner that, when one of said rotation shaft is rotated to feed out said strip wound thereon, the other rotation shaft is rotated to wind up said strip thereon; and said control means causes the driving of said respective DC brushless motors to stop when the sum of the numbers of rotations of said two motors as detected by said Hall-effect devices of said motors reaches a predetermined value.

2. The DC brushless motor control apparatus according to claim 1 wherein said strip comprises posters of a same length having adjacent ends thereof extending perpendicularly to the length of said strip joined together; and said preset value is determined in relation to said length of said posters.

3. The DC brushless motor control apparatus according to claim 1 wherein said DC brushless motors are housed in said respective rotation shafts.

* * * * *